No. 897,728. PATENTED SEPT. 1, 1908.
B. J. FALK.
HOLDER FOR VIEWING TRANSPARENCIES.
APPLICATION FILED APR. 9, 1908.
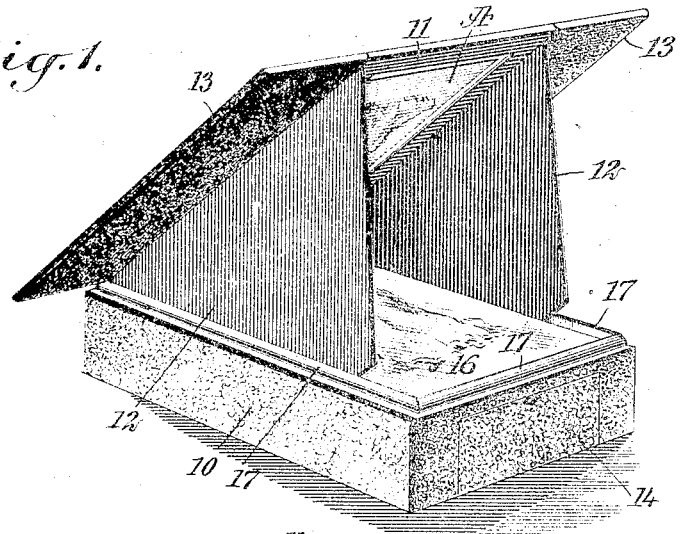
Fig. 1.
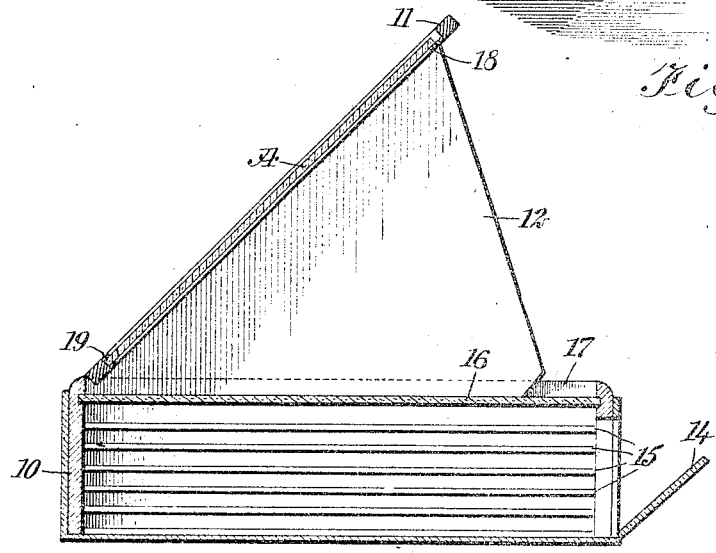
Fig. 2.
Fig. 3.
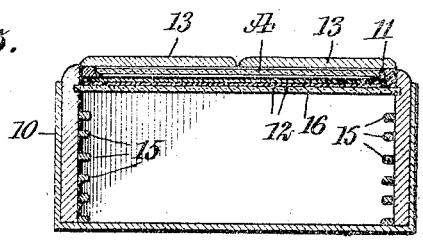
WITNESSES
Geo. W. Naylor
C. W. Fairbank
INVENTOR
Benjamin J. Falk
BY Munn & Co
ATTORNEYS

UNITED STATES PATENT OFFICE.

BENJAMIN J. FALK, OF NEW YORK, N. Y.

HOLDER FOR VIEWING TRANSPARENCIES.

No. 897,728.　　　　　Specification of Letters Patent.　　　　　Patented Sept. 1, 1908.

Application filed April 9, 1908. Serial No. 426,060.

*To all whom it may concern:*

Be it known that I, BENJAMIN J. FALK, a citizen of the United States, and a resident of the city of New York, borough of Manhattan, in the county and State of New York, have invented a new and Improved Holder for Viewing Transparencies, of which the following is a full, clear, and exact description.

This invention relates to certain improvements in holders for supporting transparencies in such a position that the light from any suitable source may shine directly thereon, and the image clearly seen in a mirror or other reflector.

Transparencies, particularly those manufactured by the latest processes of color photography, can be viewed to advantage only when exposed to a comparatively bright light and viewed from the opposite side. The transparencies should not be handled any more than is positively necessary, due to their fragile character and the ease with which they are broken. Holders have been devised for supporting a transparency in an inclined position with a reflector so disposed as to direct the light rays from a window or other suitable source of light through the transparency. This does not operate satisfactorily, as the transparency should receive the maximum amount of light.

In my improved construction, I mount the transparency in an inverted position in its frame, and expose it directly to the light rays. The person then views the reflection in the mirror rather than looking directly at the transparency. In this manner, the mirror is shaded from all light rays except those passing through the transparency, and the latter being directly exposed to the light receives the full illumination.

Reference is to be had to the accompanying drawings, forming a part of this specification, in which similar characters of reference indicate corresponding parts in all the figures, and in which Figure 1 is a perspective view of a device constructed in accordance with my invention; Fig. 2 is a central longitudinal section showing the parts in operative position; and Fig. 3 is a transverse section, showing the parts in their folded position.

In the specific form illustrated in the accompanying drawings, I provide a base 10, preferably in the form of a box adapted for the storage of extra plates or transparencies. Hinged to one end of the box is a frame 11, adapted to hold a transparency when it is being viewed, and the frame carries two triangular shaped side wings 12 and two cover sections 13. The base or box may be constructed to hold any number of plates or transparencies desired. The box at the front end is provided with a hinged closure 14, and within the box are longitudinally-disposed ridges or guideways 15, serving to space the transparencies apart and permit the withdrawal of any one independently of the others. The upper surface of the box is formed of a mirror 16, preferably of glass, and this mirror is spaced a short distance below the upper edges of the sides, so that there are formed upwardly-extending flanges 17 on the opposite sides and ends of the box. The frame 11 is of a thickness slightly less than the height of the flanges 17, and is designed to receive and hold a transparency A. The opening through the frame is slightly smaller than the transparency, and extending around the opening is a flange 18, serving to support the transparency in the plane of the frame. At the lower edge of the opening or adjacent the hinged end of the frame, a second flange 19 may be provided at the front surface, so as to form a groove between it and the adjacent flange 18, for receiving the lower edge of the transparency and preventing its accidental displacement.

The two triangular side wings 12 are hinged to the under surface of the frame 11, at its opposite sides, but are unattached to the base or box. The wings are preferably of black material, or, at least, their inner surfaces are coated black, and are of sufficient rigidity to support the frame in an elevated position, substantially as shown in Fig. 1. The lower edges of the wings rest directly upon the mirror, or adjacent the edges thereof, and are prevented from outward movement by the flanges 17. The two cover sections 13 are also hinged to the frame 11 along its side edges, and each cover section is of a size substantially equal to one-half the size of the frame. These covers are so hinged that they may be moved outwardly to positions substantially in alinement with the frame, as shown in Fig. 1, or may be folded toward each other to completely cover the frame as shown in Fig. 3.

In the use of my improved device, the frame 11 at its free end is raised upwardly to the proper angle in respect to the base, and the wings 12 serve to support it against return movement. The covers 13 are moved outwardly to expose the upper surface of the frame, and the transparencies are placed in the frame one at a time, in an inverted position, that is, with the upper portion of the picture shown in the transparency at the lower or hinged edge of the frame.

The device is so placed that light from any suitable source, as, for instance, a window, may shine directly upon the transparency, and the person viewing the same stands at the opposite side of the device and looks between the two wings onto the mirror, where he sees the picture of the transparency reflected in the mirror.

When the device is not in use, the two wings 12 are moved toward each other, to fold them against the under surface of the transparency, and the frame 11 is dropped downward to occupy a position directly above the mirror and between the side flanges 17. The covers 13 are folded over the top of the frame, to prevent the admission of dust and also to give the device a finished appearance. The transparency may, if desired, be left in the frame when the latter is closed, as illustrated in Fig. 3.

By exposing the transparency or colored plate directly to the light, it receives the maximum amount of light, and the details and colors are distinctly and clearly shown in the mirror. The side wings 12 prevent the entrance of light to the mirror, except that passing through the plate or transparency, and the cover sections when in their open position, also serve to shield the source of light from view and darken the space at the rear of the device, save that space between the wings or side walls.

Having thus described my invention, I claim as new and desire to secure by Letters Patent:

1. A device for viewing transparencies or the like, comprising a base presenting an upper reflecting surface, a frame for supporting the transparency in an inverted position at an angle to said base, and extending upwardly from the junction with said reflecting surface, and triangular wings between the frame and base at the sides and foldable to a position intermediate said frame and base, when the latter are brought to positions closely adjacent each other.

2. A device for viewing transparencies or the like, comprising a base presenting an upper reflecting surface, a frame for supporting the transparency at an angle to said base and extending upwardly from one end of said reflecting surface, triangular wings between the frame and base at the sides and foldable to a position intermediate said frame and base, when the latter are brought to positions closely adjacent each other, and oppositely-disposed cover sections hinged to the opposite sides of said frame, and serving to shield the rear of the device from light when in their folded position.

3. A device for viewing transparencies or the like, comprising a box forming a base and serving for the storage of a plurality of transparencies or the like, a closure at one end of said box, an upwardly-facing mirror forming the top of said box, upwardly-extending flanges adjacent the edges of said mirror, a frame hinged to said box adjacent one end of the mirror, and having an opening therethrough and flanges adjacent said opening for supporting transparency, triangular wings hinged to the under surface of said frame adjacent the side edges thereof and adapted to support the frame at an angle to said box, and adapted to swing to positions beneath said frame when the latter is moved to a position within the flanges of the box and adjacent the mirror, and cover sections hinged to said frame adjacent the opposite edges thereof and foldable to a position to cover said frame, or to positions in substantial alinement with the frame to shield the rear of the device from light.

In testimony whereof I have signed my name to this specification in the presence of two subscribing witnesses.

BENJAMIN J. FALK.

Witnesses:
HARRY M. HIRSCH,
CLAIR W. FAIRBANK.